United States Patent
Guo et al.

(10) Patent No.: US 12,210,183 B2
(45) Date of Patent: Jan. 28, 2025

(54) BACKLIGHT MODULE AND DISPLAY DEVICE

(71) Applicant: HKC CORPORATION LIMITED, Shenzhen (CN)

(72) Inventors: Qiuyue Guo, Shenzhen (CN); Guangping Wei, Shenzhen (CN); Yunyang Liu, Shenzhen (CN); Pei Wu, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/621,365

(22) Filed: Mar. 29, 2024

(65) Prior Publication Data

US 2024/0402413 A1    Dec. 5, 2024

(30) Foreign Application Priority Data

May 31, 2023    (CN) .......................... 202310633376.5

(51) Int. Cl.
*F21V 8/00*    (2006.01)

(52) U.S. Cl.
CPC .................................. *G02B 6/0055* (2013.01)

(58) Field of Classification Search
CPC ..................................................... G02B 6/0055
See application file for complete search history.

(56) References Cited

U.S. PATENT DOCUMENTS

| | | | | | |
|---|---|---|---|---|---|
| 4,121,129 | A | * | 10/1978 | Maloney | H01J 17/494 |
| | | | | | 313/584 |
| 2019/0004231 | A1 | * | 1/2019 | Chang | G02F 1/133606 |
| 2019/0243055 | A1 | * | 8/2019 | Li | G02B 6/0043 |
| 2020/0218004 | A1 | * | 7/2020 | Yoon | G02B 6/0043 |

FOREIGN PATENT DOCUMENTS

| | | |
|---|---|---|
| CN | 1713004 A | 12/2005 |
| CN | 104806923 A | 7/2015 |
| CN | 205208250 U | 5/2016 |
| CN | 107180841 A | 9/2017 |
| CN | 107340647 A | 11/2017 |
| CN | 206877003 U | 1/2018 |
| CN | 108139618 A | 6/2018 |
| CN | 208636454 U | 3/2019 |
| CN | 111175880 A | 5/2020 |
| CN | 210835516 U | 6/2020 |
| CN | 215116868 U | 12/2021 |
| CN | 114830021 A | 7/2022 |
| CN | 115903112 A | 4/2023 |
| CN | 115993738 A | 4/2023 |

* cited by examiner

*Primary Examiner* — Thomas M Sember

(57) ABSTRACT

A backlight module and a display device are disclosed. The backlight module includes: a light guide plate that provides a surface light surface for the display panel and that has a first surface, a second surface, and a third surface, where the first surface is a light-emitting surface, and where the light incident surface connects the first and second surfaces together; a light source disposed on the light incident surface of the light guide plate and used to provide a linear light source for the light guide plate; a light absorbing and reflecting film layer disposed on the second surface of the light guide plate and used for absorbing light and reflecting blue light; and a first reflective sheet disposed on a side of the light absorbing and reflecting film layer facing away from the light guide plate.

15 Claims, 3 Drawing Sheets

BACKLIGHT MODULE AND DISPLAY DEVICE

CROSS-REFERENCE TO RELATED APPLICATIONS

This application claims the priority and benefit of Chinese patent application number 202310633376.5, titled "Backlight Module and Display Device" and filed May 31, 2023 with China National Intellectual Property Administration, the entire contents of which are incorporated herein by reference.

TECHNICAL FIELD

This application relates to the field of display technology, and more particular relates to a backlight module and a display device.

BACKGROUND

The description provided in this section is intended for the mere purpose of providing background information related to the present application but doesn't necessarily constitute prior art.

Nowadays, liquid crystal display devices (LCDs for short) are increasingly widely used due to their advantages such as low power consumption, miniaturization, and thinness. A liquid crystal display device includes an upper substrate, a lower substrate, and a liquid crystal layer disposed between the upper substrate and the lower substrate. The thickness of the liquid crystal cell (also called the thickness of the liquid crystal layer) determines the optical path difference, which in turn determines the optical properties of the liquid crystal display panel. Since liquid crystal is fluid, the thickness of the liquid crystal cell is not fixed. On the one hand, during the dropping process of the liquid crystal, the liquid crystal will diffuse to the peripheral area, resulting in more liquid crystal accumulated in the peripheral area than in the central area, so that the thickness of the liquid crystal cell in the peripheral display area is uneven. On the other hand, in the manufacturing process of the liquid crystal display panel, the liquid crystal display panel will be distorted and deformed, which will also lead to uneven thickness of the liquid crystal cell in the peripheral display area. The uneven thickness of the cell in the peripheral display area will cause the optical properties of the peripheral display area to be different from those of the central display area. Thus, the transmittance of yellow light in the peripheral display area increases, which causes the problem of yellowing in the peripheral display area when the liquid crystal display panel is displaying.

As far as the current technology is concerned, methods such as changing the color filters, reducing the thickness of the cell, and adjusting the white balance may be used, but the above methods all have the problem of lowering the transmittance. Therefore, there is an urgent need in the art for a solution to overcome the yellowing of the display panel without affecting the transmittance.

SUMMARY

In view of the above, it is a purpose of this application to provide a backlight module and a display device to overcome the yellowing problem of the display panel without affecting the transmittance.

This application discloses a backlight module, which includes a light guide plate, a light source, a light absorbing and reflecting film layer, and a first reflective sheet. The light guide plate is used to provide a surface light source for the display panel and has a first surface, a second surface, and a light incident surface. The first surface is a light-emitting surface. The light incident surface connects the first surface and the second surface. The light source is arranged on the light incident surface of the light guide plate to provide a linear light source for the light guide plate. The light absorbing and reflecting film layer is disposed on the second surface of the light guide plate for absorbing light and reflecting blue light. The first reflective sheet is disposed on a side of the light absorbing and reflecting film layer facing away from the light guide plate.

In some embodiments, the light absorbing and reflecting film layer includes a magnesium layer, an amorphous silicon layer, and a silicon dioxide layer. The magnesium layer is disposed on the silicon dioxide layer. The silicon dioxide layer is disposed on the amorphous silicon layer. The side of the magnesium layer facing away from the silicon dioxide layer is adjacent to the light guide plate. The side of the amorphous silicon layer facing away from the silicon dioxide layer is adjacent to the first reflective sheet.

In some embodiments, the thickness of the amorphous silicon layer lies in the range of 25 nm-40 nm, the thickness of the silicon dioxide layer lies in the range of 185 nm-200 nm, and the thickness of the magnesium layer is 160 nm.

In some embodiments, the light absorbing and reflecting film layer includes an amorphous silicon layer and a silicon dioxide layer. The silicon dioxide layer is disposed on the amorphous silicon layer. The side of the silicon dioxide layer facing away from the amorphous silicon layer is close to the light guide plate. The side of the amorphous silicon layer facing away from the silicon dioxide layer is close to the first reflective sheet. The thickness of the amorphous silicon layer lies in the range of 10 nm-30 nm, and the thickness of the silicon dioxide layer lies in the range of 140 nm-160 nm.

In some embodiments, the light absorbing and reflecting film layer includes a plurality of light absorbing and reflecting structures arranged in an array, with a gap defined between every two adjacent light absorbing and reflecting structures. Each light absorbing and reflecting structure at least includes an amorphous silicon layer and a silicon dioxide layer. Each light absorbing and reflecting structure is used to absorb light and reflect blue light.

In some embodiments, the backlight module includes a central area and a peripheral area, the peripheral area being arranged surrounding the central area. A density of the plurality of light absorbing and reflecting structures disposed in the central area is less than the density of the plurality of light absorbing and reflecting structures disposed in the peripheral area.

In some embodiments, the backlight module further includes a second reflective sheet, which is disposed between the light guide plate and the light absorbing and reflecting film layer. The second reflective sheet includes a plurality of hollow portions. The plurality of light absorbing and reflecting structures are arranged in one-to-one correspondence with the plurality of hollow portions.

In some embodiments, the backlight module further includes a first driving structure used to drive the light absorbing and reflecting film layer to move relative to the second reflective sheet. When the facing area between each light absorbing and reflecting structure and the respective hollow portion decreases, the intensity of blue light reflected by the light absorbing and reflecting structure becomes less.

In some embodiments, the backlight module further includes a second driving structure, the second driving structure being used to drive the second reflective sheet to move relative to the light absorbing and reflecting film layer. When the facing area between each light absorbing and reflecting structure and the respective hollow portion decreases, the intensity of blue light reflected by the light absorbing and reflecting structure becomes less.

This application further discloses a display device, which includes a display panel and the above-mentioned backlight module.

In this application, in an edge-type backlight module, the second surface of the light guide plate is provided with a light absorbing and reflecting film layer, which absorbs light of some wavelengths and then reflects blue light to enhance the proportion of blue light in the display panel, thus making up for the yellowing problem of the panel display. In this solution, since the light absorbing and reflecting film layer is arranged below the light guide plate, it will not affect the transmittance of the display panel, and it may also reduce the loss of light as much as possible when otherwise passing through more film layers. More importantly, it can absorb excess light and reflect blue light to enhance the display effect of the display panel, so as to overcome the problem of yellowing of the display panel without affecting the transmittance.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of this application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
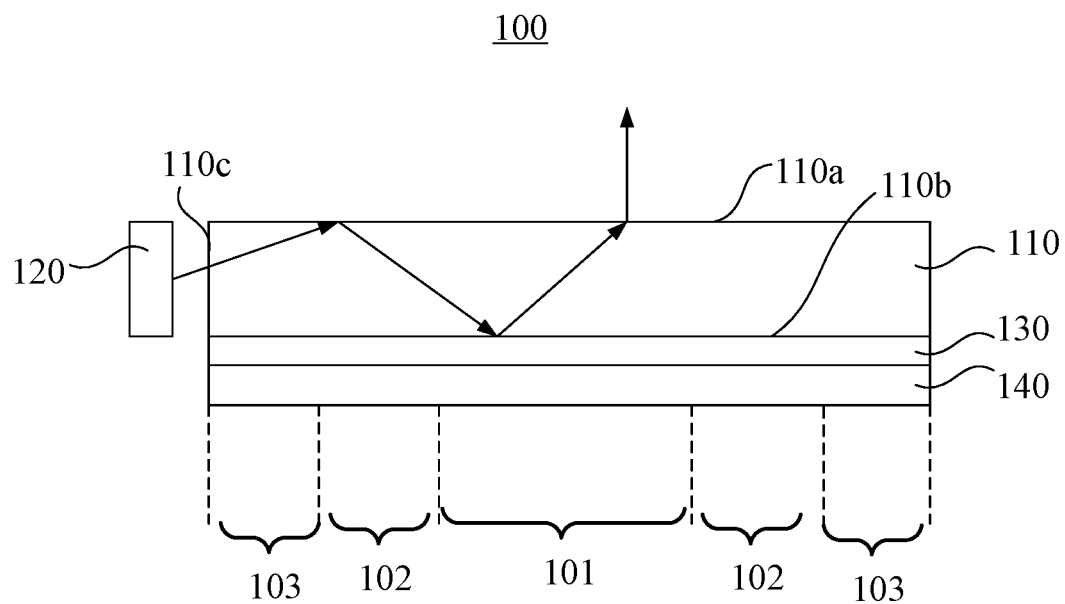
FIG. 1 is a schematic diagram illustrating a backlight module according to a first embodiment of the present application.

In the drawings: 100, backlight module; 101, central area; 102, peripheral area; 103, edge area; 110, light guide plate; 110a, first surface; 110b, second surface; 110c, light incident surface; 120, light source; 130, light absorbing and reflecting film layer; 131, magnesium layer; 132, amorphous silicon layer; 133, silicon dioxide layer; 134, light absorbing and reflecting structure; 135, gap; 140, first reflective sheet; 150, second reflective sheet; 151, hollow portion; 160, first driving structure; 180, backplate; 200, display device; 210, display panel.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. In addition, terms "up", "down", "left", "right", "vertical", and "horizontal", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these in terms are not to be construed as restricting the present disclosure. For those of ordinary skill in the art, the specific meanings of the above terms as used in the present application can be understood depending on specific contexts.

Hereinafter this application will be described in further detail with reference to the accompanying drawings and some optional embodiments.

Embodiment 1

FIG. 1 shows a schematic diagram of a backlight module according to a first embodiment of the present application. Referring to FIG. 1, the present application discloses a backlight module. The backlight module 100 includes a light guide plate 110, a light source 120, a light absorbing and reflecting film layer 130, and a first reflective sheet 140. The light guide plate 110 is used to provide a surface light source 120 for the display panel, and has a first surface 110a, a second surface 110b, and a light incident surface 110c. The first surface 110a is a light emitting surface. The light incident surface 110c connects the first surface 110a and the second surface 110b. The light source 120 is disposed on the light incident surface 110c of the light guide plate 110 for providing the light guide plate 110 with a linear light source 120. The light absorbing and reflecting film layer 130 is disposed on the second surface 110b of the light guide plate 110 for absorbing light and reflecting blue light. The first reflective sheet 140 is disposed on a side of the light absorbing and reflecting film layer 130 facing away from the light guide plate 110.

The light absorbing and reflecting film layer 130 is a film layer that can absorb light and then reflect blue light. It has spectral selectivity and can absorb light of other colors almost uniformly and reflect blue light.

In this application, in an edge-type backlight module 100, the second surface 110b of the light guide plate 110 is provided with a light absorbing and reflecting film layer 130, which absorbs light of some wavelengths and then reflects blue light, thereby increasing the proportion of blue light in the display panel to compensate for the yellowing problem of the panel display. In this solution, since the light absorbing and reflecting film layer 130 is disposed under the light guide plate 110, it will not affect the transmittance of the display panel, and may also reduce the loss of light as much as possible when otherwise passing through more film layers. More importantly, it may absorb excess light and reflect blue light to enhance the display effect of the display panel, so as to overcome the problem of yellowing of the display panel without affecting the transmittance.

It may be appreciated that the backlight module 100 in this embodiment may be an edge-type backlight module 100. The linear light source 120 of the light source 120 is converted into a surface light source 120 by the light guide plate 110, and the first reflective sheet 140 disposed on the second surface 110b of the light guide plate 110 mainly reflects the light leaked from the light guide plate 110. In particular, the backlight module 100 may further include structures such as a backplate, a prism sheet, and a diffusion sheet. The backplate is disposed on the side of the first reflective sheet 140 facing away from the light guide plate 110. The prism sheet is disposed on the first surface 110a of the light guide plate 110, and the diffusion sheet is disposed above the prism sheet.

Figure 2:
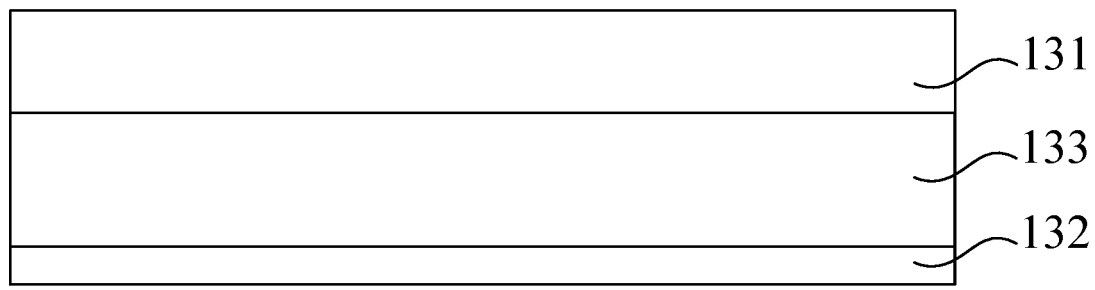
FIG. 2 is a schematic diagram illustrating a first light absorbing and reflecting film layer according to the present application.

Refer to FIG. 2, there is shown a schematic diagram illustrating a first light absorbing and reflecting film layer according to the present application. The light absorbing and reflecting film layer 130 adopts a multi-film layer stacked structure. The light absorbing and reflecting film layer 130 includes a magnesium layer 131, an amorphous silicon layer 132, and a silicon dioxide layer 133. The magnesium layer 131 is disposed on the silicon dioxide layer 133. The silicon dioxide layer 133 is disposed on the amorphous silicon layer 132. The side of the magnesium layer 131 facing away from the silicon dioxide layer 133 is adjacent to the light guide plate 110. The side of the amorphous silicon layer 132 facing away from the silicon dioxide layer 133 is adjacent to the first reflective sheet 140.

In this embodiment, the light absorbing and reflecting film layer 130 adopts a structure composed of magnesium, amorphous silicon (a-si), and silicon dioxide, and it may be configured as a whole-layer structure or as multiple light absorbing and reflecting structures 134, with each light absorbing and reflecting structure 134 is a stacked structure using the above three materials stacked together. That is, by changing the area of the light absorbing and reflecting film layer 130 or changing the quantity and density of the light absorbing and reflecting structures 134, the amount of reflected blue light can be adjusted to achieve the required reflection of blue light.

The light absorbing and reflecting film layer 130 may not only absorb light of some wavelengths, but also produce by adjustments the light that meets the preset requirements, such as blue light, red light, green light, etc. depending on selection. In particular, by controlling the thickness of the amorphous silicon layer 132, the tuned absorption and resonance can be achieved. In different thickness combinations of the amorphous silicon layer 132 and the silicon dioxide layer 133, reflection of different colors may be achieved, such as blue light, red light, green light, etc.

In the present application, the thickness of each film layer of the light absorbing and reflecting film layer 130 is in particular as follows: the thickness of the amorphous silicon layer 132 is 25 nm-40 nm, the thickness of the silicon dioxide layer 133 is 185 nm-200 nm, and the thickness of the magnesium layer 131 is 160 nm. The thickness ranges each include endpoint values, and the thickness of the magnesium layer 131 may be assumed within +10 nm. In this solution, the light absorbing and reflecting film layer 130 may absorb light of other colors and reflect blue light. The yellowing problem of the display panel may be solved by enhancing blue light or filtering out yellow light. In the exemplary technology, a yellow light filtering structure is disposed on the first surface 110a of the light guide plate 110, that is, on the side of the light-emitting surface of the light guide plate 110. Although it can overcome the yellowing problem caused by too much yellow light and insufficient blue light on the one hand, the yellow light filtering structure would also absorb part of the light, resulting in more light loss, thereby causing the problem of greater light loss. In contrast, in the present application, by disposing the light absorbing and reflecting film layer 130 on the second surface 110 b of the light guide plate 110, light does not need to pass through the light absorbing and reflecting film layer 130.

Figure 3:
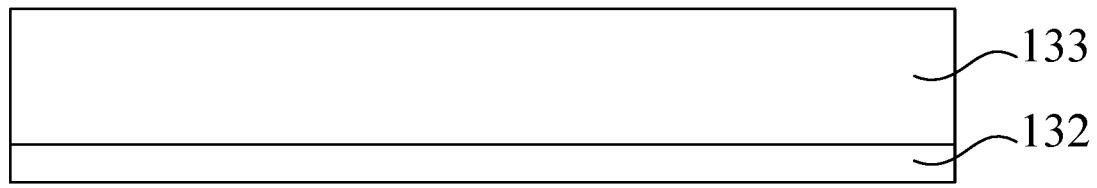
FIG. 3 is a schematic diagram illustrating a second light absorbing and reflecting film layer according to the present application.

Referring to FIG. 3, there is shown a schematic diagram of a second light absorbing and reflecting film layer according to the present application. In another implementation, the magnesium layer 131 in the light absorbing and reflecting film layer 130 may also be removed. In particular, the light absorbing and reflecting film layer 130 includes an amorphous silicon layer 132 and a silicon dioxide layer 133. The silicon dioxide layer 133 is disposed on the amorphous silicon layer 132. The side of the silicon dioxide layer 133 facing away from the amorphous silicon layer 132 is adjacent to the light guide plate 110. The side of the amorphous silicon layer 132 facing away from the silicon dioxide layer 133 is adjacent to the first reflective sheet 140. The thickness of the amorphous silicon layer 132 lies in the range of 10 nm-30 nm, and the thickness of the silicon dioxide layer 133 lies in the range of 140 nm-160 nm.

After the magnesium layer 131 is removed, the light absorbing and reflecting film layer 130 also has the same function as the light absorbing and reflecting film layer 130 formed by the above-mentioned three layers of materials, except that there are differences in their thicknesses and reflection efficiencies. It can also improve the yellowing problem of the display panel to a certain extent, improve the display effect of the panel to meet customer needs, improve the performance and quality of the display panel, and improve user experience and satisfaction.

In this embodiment, the intensity of the emitted blue light can be adjusted by changing the area of the light absorbing and reflecting film layer 130.

In one embodiment, the light emitting surface of the backlight module 100 is divided into a central area 101 and a peripheral area 102. The peripheral area 102 is disposed to surround the central area 101. The central area 101 corresponds to the central display area of the display panel, and the peripheral area 102 corresponds to the peripheral display area of the display panel. In order to solve the problem of unevenness of yellowing between the central display area and the peripheral display area of the display panel, in this embodiment, the area of the light absorbing and reflecting film layer in the central area 101 may be set differently than the area of the light absorbing and reflecting film layer in the peripheral area 102. For example, the area of the light absorbing and reflecting film layer 130 in the peripheral area 102 may be relatively larger, so that more blue light can be reflected.

In addition to using the method of different areas, the configuration of the multiple film layers of the light absorbing and reflecting film layer 130 may also be different in different areas. For example, the thicknesses of the silicon dioxide layer 133 and the amorphous silicon layer 132 in the light absorbing and reflecting film layer 130 of the central area 101 may be thinner. For another example, the light absorbing and reflecting film layer 130 in the central area 101 may only use two film layers, that is, the silicon dioxide layer 133 and the amorphous silicon layer 132, while the light absorbing and reflecting film layer 130 in the peripheral area 102 may use three film layers, that is, the amorphous silicon layer 132, the silicon dioxide layer 133, and the magnesium layer 131.

In another embodiment, the light absorbing and reflecting film layer 130 may be divided into a plurality of individual light absorbing and reflecting structures 134, where each light absorbing and reflecting structure 134 at least includes the amorphous silicon layer 132 and the silicon dioxide layer 133. In one case, the three-layer film structure including the magnesium layer 131, the amorphous silicon layer 132, and the silicon dioxide layer 133 may be selected. In other cases, the two-layer film structure including the amorphous silicon layer 132 and the silicon dioxide layer 133 may be selected.

In this solution, the intensity of the reflected blue light may be controlled by controlling the density or number of the light absorbing and reflecting structures 134. For example, the density of the light absorbing and reflecting structures 134 in the peripheral area 102 may be higher, the distance between each other may be smaller, and the number may be larger, while the density of the light absorbing and reflecting structures 134 in the central area 101 may be smaller. For the central area 101, a plurality of light absorbing and reflecting structures 134 may be arranged evenly, while for the peripheral area 102, the density of a plurality of light absorbing and reflecting structures 134 can be gradually increased along the direction extending from the central area 101 to the peripheral area 102, so as to overcome the yellowing phenomenon of the peripheral area 102.

Apart from adopting the solution based on quantity and density, the thicknesses of the film layers of each light absorbing and reflecting structure 134 may also be made different. In particular, the thickness of each layer of the light absorbing and reflecting film layer 130 in the central area 101 may be set to be relatively thinner, while the thickness of each film layer of the light absorbing and reflecting film layer 130 may gradually increase in the direction extending toward the edges.

The light emitting surface of the backlight module 100 may be slightly larger than the display area of the display panel. The area of the backlight module 100 beyond the display area, that is, the area corresponding to the non-display area of the display panel is the edge area 103. A whole layer of light absorbing and reflecting film layer 130 may be formed in the edge area 103, and multiple light absorbing and reflecting structures 134 may be used in the central area 101 and the peripheral area 102 to form an array distribution.

It may be appreciated that the above ways of changing the area, number, density and thickness of each film layer of the light absorbing and reflecting structure(s) 134 may be used in combination or alone, the purpose of which is to overcome the problem of uneven yellowing in different areas of the display panel and the occurrence of transitions at the junction of different areas of the display panel. In the field, parameters such as the number, density, thickness, and area of the light absorbing and reflecting structure(s) 134 may be reasonably set based on actual conditions, so as to address the problem of yellowing of the display panel.

Embodiment 2

Figure 4:
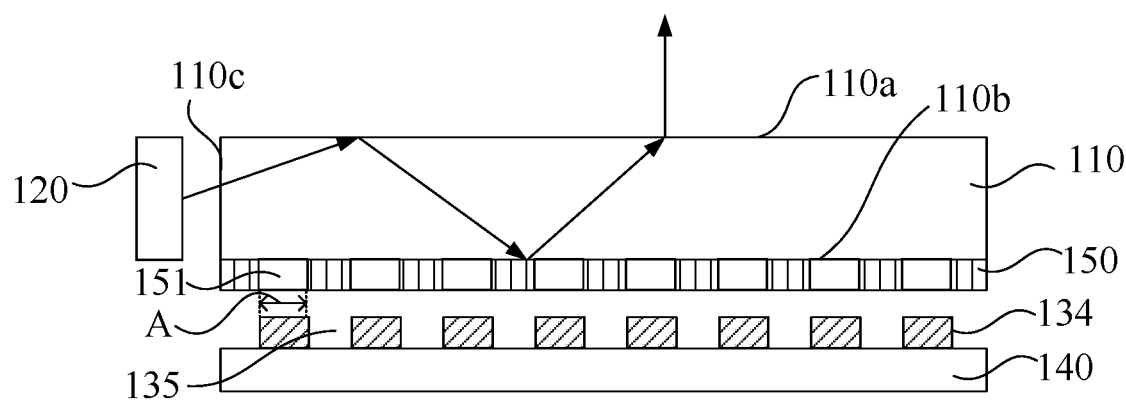
FIG. 4 is a schematic diagram illustrating a backlight module according to a second embodiment of the present application.

FIG. 4 is a schematic diagram illustrating a backlight module according to a second embodiment of the present application. Referring to FIG. 4, as a second embodiment of the present application, a backlight module 100 is disclosed. The backlight module 100 includes a light guide plate 110, a light source 120, a light absorbing and reflecting film layer 130, a first reflective sheet 140, a second reflective sheet 150, and a backplate 180.

The second reflective sheet 150 is disposed between the light guide plate 110 and the light absorbing and reflecting film layer 130. The light absorbing and reflecting film layer 130 includes a plurality of light absorbing and reflecting structures 134 arranged in an array. Each light absorbing and reflecting structure 134 at least includes an amorphous silicon layer 132 and a silicon dioxide layer 133. Each light absorbing and reflecting structure 134 is used to absorb light and reflect blue light. The second reflective sheet 150 includes a plurality of hollow portions 151. The plurality of light absorbing and reflecting structures 134 are disposed in one-to-one correspondence with the plurality of hollow portions 151. The first reflective sheet 140 is disposed on the backplate 180.

The first reflective sheet 140 and the second reflective sheet 150 may be made of the same material, but the difference is that the second reflective sheet 150 defines a plurality of hollow portions 151, which are disposed corresponding to the light absorbing and reflecting structures 134, respectively.

Compared with the previous embodiment, this embodiment includes two layers of reflective sheets. The main consideration is that the light absorbing and reflecting film layer 130 will absorb part of the light, resulting in a slight decrease in the brightness of the backlight, although for the first embodiment the power consumption of the backlight module 100 may be increased to solve this problem. However, in order to further consider the problem of low power consumption in this embodiment, two layers of reflective sheets are used to solve this problem. The second reflective sheet 150 is directly attached to the second surface 110b of the light guide plate 110, so that most of the light emitted from the second surface 110b of the light guide plate 110 is reflected by the second reflective sheet 150 to enhance the brightness of the backlight module 100. The remaining part of the light would be absorbed by the light absorbing and reflecting film layer 130 which then reflects blue light, which is in turn emitted from the first surface 110 a of the light guide plate 110.

It may be understood that the first reflective sheet 140 and the second reflective sheet 150 are both opaque and capable of reflecting light, and the hollow portion 151 of the second reflective sheet 150 is able to transmit light, and is may be provided with a transparent material or completely hollowed out without any material.

In one embodiment, the light absorbing and reflecting structures 134 may be respectively disposed in the hollow portions 151; that is, the second reflective sheet 150 and the light absorbing and reflecting film layer 130 may be combined into one to form a composite film layer.

In particular, the backlight module 100 may include a central area 101 and a peripheral area 102. The peripheral area 102 is arranged around the central area 101. The density of the plurality of light absorbing and reflecting structures 134 arranged in the central area 101 may be smaller than the density of the plurality of light absorbing and reflecting structures 134 arranged in the peripheral area 102.

In this embodiment, the position of each hollow portion 151 of the second reflective sheet 150 may be arranged according to the actual distribution of the light absorbing and reflecting structures 134. The shape of the hollow portion 151 may be designed according to the shape of the light absorbing and reflecting structure 134, for example, its projection on the first reflective sheet 140 may be a circle, a square, or the like. In particular, array arrangements such as circular array or linear array, etc. may be possible.

Embodiment 3

Figure 5:
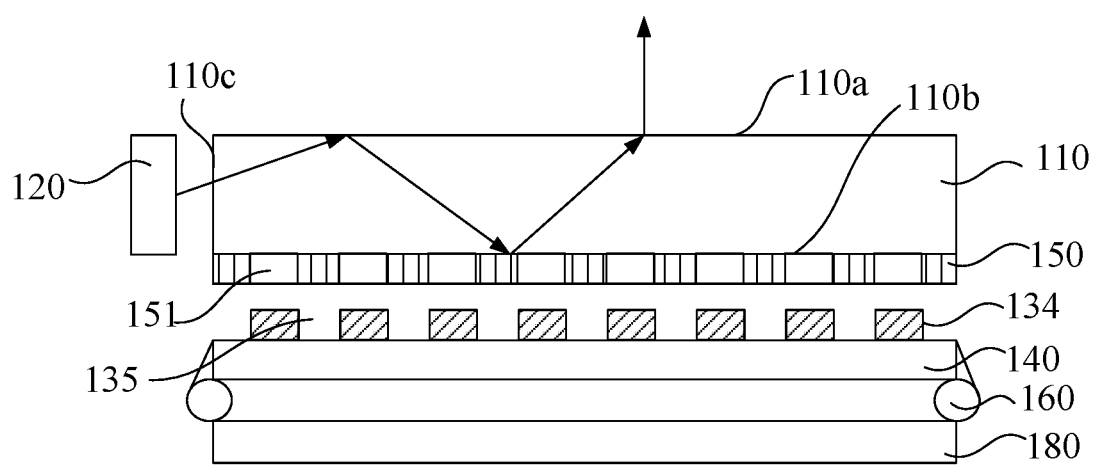
FIG. 5 is a schematic diagram illustrating a backlight module according to a third embodiment of the present application.

FIG. 5 is a schematic diagram of a backlight module according to a third embodiment of the present application. As shown in FIG. 5, the backlight module 100 includes a light guide plate 110, a light source 120, a light absorbing and reflecting film layer 130, a first reflective sheet 140, a second reflective sheet 150, and a first driving structure 160.

The second reflective sheet 150 is disposed between the light guide plate 110 and the light absorbing and reflecting film layer 130. The light absorbing and reflecting film layer 130 includes a plurality of light absorbing and reflecting structures 134 arranged in an array. Each light absorbing and reflecting structure 134 at least includes an amorphous silicon layer 132 and a silicon dioxide layer 133. The light absorbing and reflecting structure 134 is used to absorb light and reflect blue light. The second reflective sheet 150 includes a plurality of hollow portions 151, and the plurality of light absorbing and reflecting structures 134 are disposed in one-to-one correspondence with the plurality of hollow portions 151. The first driving structure 160 is used to drive the light absorbing and reflecting film layer 130 to move relative to the second reflective sheet 150 so that the facing area A between each light absorbing and reflecting structure 134 and the respective hollow portion 151 changes. When the facing area A between each light absorbing and reflecting structure 134 and the respective hollow portion 151 is reduced, the intensity of blue light reflected by the light absorbing and reflecting structure 134 becomes smaller.

This embodiment differs from the previous embodiment in that the previous embodiment can only determine the intensity of the reflected blue light at the beginning of design. In this embodiment, however, real-time adjustment of blue light is achieved by providing a driving structure to change the exposed area of each light absorbing and reflecting structure 134 from the respective hollow portion 151. That is, on the basis of the second embodiment, the light absorbing and reflecting film layer 130 and the second reflective sheet 150 are designed as a two-layer structure and are movable relative to each other. Through the control of the first driving structure 160, the light absorbing and reflecting film layer 130 is moved, so that each hollow portion 151 and the respective light absorbing and reflecting structure 134 are no longer directly facing each other, but partially overlap, and the overlapping area between the hollow portion 151 and the light absorbing and reflecting structure 134 can be adjusted through the control of the first driving structure 160. As mentioned above, the area of the non-hollow portion 151 of the second reflective sheet 150 is opaque. Therefore, the area of each light absorbing and reflecting structure 134 exposed at the position of the respective hollow portion 151 is adjusted in real time thereby adjusting the intensity of the reflected blue light in real time according to different degrees of yellowing.

This solution mainly uses a driving mechanism to control the area of eacg light absorbing and reflecting structure exposed at the position of the respective hollow portion 151 of the second reflective sheet 150 to achieve a controllable effect, thereby improving the panel display effect. Without losing the panel transmittance and increasing the backlight power consumption, this can to a certain extent improve the yellowing display phenomenon that may occur on panels, improve the display effect of the panel to meet customer needs, improve the performance and quality of the display, and improve user experience and satisfaction.

Figure 6:
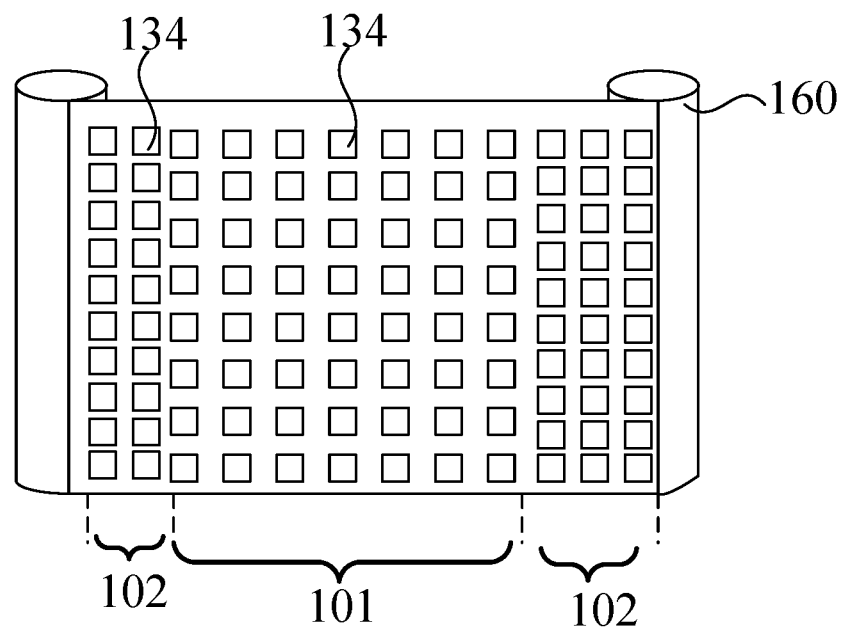
FIG. 6 is a schematic diagram illustrating a first driving structure and a light absorbing and reflecting film layer of the present application.

Referring to FIG. 6, there is shown a schematic diagram of a first driving structure and a light absorbing and reflecting film layer according to the present application. The first driving structure 160 includes a driving mechanism, a first bearing and a second bearing. The first bearing and the second bearing are respectively arranged on both sides of the light absorbing and reflecting film layer 130. When the light absorbing and reflecting film layer 130 moves from the second bearing in the direction of the first bearing, the first bearing serves as a transmission shaft, and the second bearing serves as a driven shaft. When the light absorbing and reflecting film layer 130 moves from the first bearing to the second bearing, the first bearing serves as the driven shaft and the second bearing serves as the transmission shaft. The driving mechanism may drive the first bearing and the second bearing to rotate simultaneously or in a time-sharing manner to drive the light absorbing and reflecting film layer to move.

It may be appreciated that a part of light absorbing and reflecting film layer 130 needs to be rolled up on the first bearing and the second bearing, so that during the rotation of the first bearing or the second bearing, the light absorbing and reflecting film layer 130 is driven may be move. In actual use, in particular, the distance by which that the light absorbing and reflecting film layer 130 moves is very small, which is related to the width of the hollow portion 151. It is merely needed to realize the configuration that each light absorbing and reflecting structure 134 completely occupies the respective hollow portion 151 until the same light absorbing and reflecting structure 134 does not overlap the hollow portion 151 at all; that is, it is merely needed to move by a distance of the width of one hollow portion 151.

In order to prevent the light absorbing and reflecting film layer 130 from breaking, the light absorbing and reflecting film layer 130 structure may be arranged on a transparent film, such as film glue or other transparent films. One or two layers of transparent films may be arranged, and an array of light absorbing and reflecting structures 134 may be arranged on the transparent film(s). In particular, the movement of the light absorbing and reflecting film layer 130 may be controlled by rolling the transparent film(s) up on the first bearing and the second bearing.

In this embodiment, the light absorbing and reflecting film layer 130 and the first reflective sheet 140 may be configured as a composite structural film layer. That is, the first reflective sheet 140 may be provided with a groove or a through slot at the position corresponding to each light absorbing and reflecting structure 134, where there is no film layer here. Thus, the light absorbing and reflecting structure 134 may be arranged in the groove, thus forming the first reflective sheet 140 integrated with the light absorbing and reflecting structure 134, so that the first reflective sheet 140 is drivingly connected to the first bearing and the second bearing to achieve the function of controlling the movement of the light absorbing and reflecting structure 134.

In another embodiment, the backlight module 100 may further include a second driving structure. The second driving structure may be consistent with the first driving structure. The second driving structure is used to drive the second reflective sheet 150 to move relative to the light absorbing and reflecting film layer 130, so that the facing area A between each light absorbing and reflecting structure 134 and the respective hollow portion 151 changes. The second driving structure may be consistent with that of the first driving structure 160. The difference is that the second driving structure is used to drive the second reflective sheet 150 to move. The movement of the second reflective sheet 150 may also change the area of each light absorbing and reflecting structure, thereby adjusting the intensity of the reflected blue light.

In this embodiment, the number, density, thickness and other designs of the light absorbing and reflecting structures 134 provided in any of the above embodiments can be used in combination to better solve the yellowing problem of the display panel.

Embodiment 4

Figure 7:
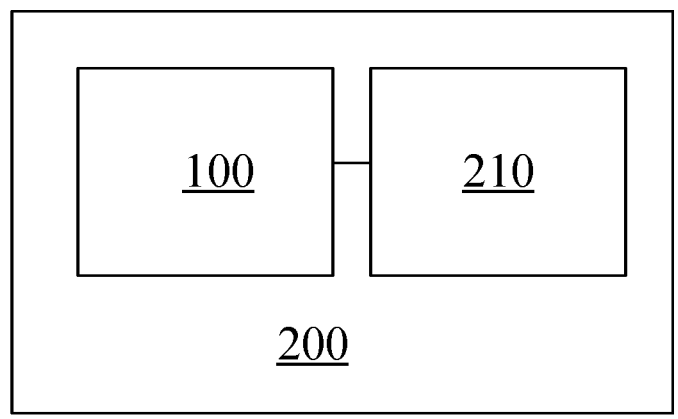
FIG. 7 is a schematic diagram illustrating a display device according to the present application.

Referring to FIG. 7, there is shown a schematic diagram illustrating a display device according to the present application. This application further discloses a display device. The display device 200 includes a display panel 210 and the backlight module 100 described in any of the above embodiments. The backlight module 100 provides a light source for the display panel 210.

In this application, in an edge-type backlight module, the second surface of the light guide plate is provided with a light absorbing and reflecting film layer, which absorbs light of some wavelengths and then reflects blue light to enhance the proportion of blue light in the display panel, thus making up for the yellowing problem of the panel display. In this solution, since the light absorbing and reflecting film layer is arranged below the light guide plate, it will not affect the transmittance of the display panel, and it may also reduce the loss of light as much as possible when otherwise passing through more film layers. More importantly, it can absorb excess light and reflect blue light to enhance the display effect of the display panel, so as to overcome the problem of yellowing of the display panel without affecting the transmittance.

It should be noted that the inventive concept of this application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of this application made with reference to some specific illustrative embodiments, and the specific implementations of this application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A backlight module, comprising:
a light guide plate, used to provide a surface light source for a display panel and having a first surface, a second surface, and a light incident surface;
wherein the first surface is a light emitting surface, and wherein the light incident surface connects the first surface and the second surface together;
a light source, disposed on the light incident surface of the light guide plate and used to provide a linear light source for the light guide plate;
a light absorbing and reflecting film layer, disposed on the second surface of the light guide plate and used to absorb light and reflect blue light; and
a first reflective sheet, disposed on a side of the light absorbing and reflecting film layer facing away from the light guide plate;
wherein the light absorbing and reflecting film layer comprises a magnesium layer, an amorphous silicon layer, and a silicon dioxide layer;
wherein the magnesium layer is disposed on the silicon dioxide layer, the silicon dioxide layer is disposed on the amorphous silicon layer, and wherein a side of the magnesium layer facing away from the silicon dioxide layer is adjacent to the light guide plate; wherein a side of the amorphous silicon layer facing away from the silicon dioxide layer is adjacent to the first reflective sheet.

2. The backlight module as recited in claim 1, wherein the amorphous silicon layer has a thickness that lies in the range of 25 nm-40 nm, the silicon dioxide layer has a thickness that lies in the range of 185 nm-200 nm, and the magnesium layer has a thickness of 160 nm.

3. The backlight module as recited in claim 1, wherein the light absorbing and reflecting film layer comprises the amorphous silicon layer and the silicon dioxide layer;
wherein the silicon dioxide layer is disposed on the amorphous silicon layer, a side of the silicon dioxide layer facing away from the amorphous silicon layer is adjacent to the light guide plate; and wherein a side of the amorphous silicon layer facing away from the silicon dioxide layer is adjacent to the first reflective sheet;
wherein the amorphous silicon layer has a thickness that lies in the range of 10 nm-30 nm, and the silicon dioxide layer has a thickness that lies in the range of 140 nm-160 nm.

4. A backlight module, comprising:
a light guide plate, used to provide a surface light source for a display panel and having a first surface, a second surface, and a light incident surface; wherein the first surface is a light emitting surface, and wherein the light incident surface connects the first surface and the second surface together;
a light source, disposed on the light incident surface of the light guide plate and used to provide a linear light source for the light guide plate;
a light absorbing and reflecting film layer, disposed on the second surface of the light guide plate and used to absorb light and reflect blue light; and
a first reflective sheet, disposed on a side of the light absorbing and reflecting film layer facing away from the light guide plate;
wherein the light absorbing and reflecting film layer comprises a plurality of light absorbing and reflecting structures arranged in an array, and wherein there is defined a gap between every two adjacent light absorbing and reflecting structures;

wherein each of the plurality of light absorbing and reflecting structures at least comprises an amorphous silicon layer and a silicon dioxide layer, and wherein the light absorbing and reflecting structure is used for absorbing light and reflecting blue light.

5. The backlight module as recited in claim 4, wherein the backlight module comprises a central area and a peripheral area, the peripheral area surrounding the central area; wherein a density of the plurality of light absorbing and reflecting structures disposed in the central area is less than a density of the plurality of light absorbing and reflecting structures disposed in the peripheral area.

6. The backlight module as recited in claim 5, wherein a film thickness of each of the plurality of light absorbing and reflecting film structures gradually increases in a direction extending from the central area to edges of the display panel.

7. The backlight module as recited in claim 4, wherein the backlight module comprises a central area and a peripheral area, the peripheral area being arranged surrounding the central area, and wherein the silicon dioxide layer and the amorphous silicon layer in the light absorbing and reflecting film layer corresponding to the central area are respectively thinner than the silicon dioxide layer and amorphous silicon layer in the light absorbing and reflecting film layer corresponding to the peripheral area.

8. The backlight module as recited in claim 4, wherein the backlight module comprises a central area and a peripheral area, the peripheral area being arranged surrounding the central area, and wherein an area of the light absorbing and reflecting film layer in the peripheral area is larger than the area of the light-absorbable reflective film layer in the central area.

9. The backlight module as recited in claim 4, wherein the backlight module further comprises a second reflective sheet disposed between the light guide plate and the light absorbing and reflecting film layer;
wherein the second reflective sheet comprises a plurality of hollow portions, and wherein the plurality of light absorbing and reflecting structures are disposed in one-to-one correspondence with the plurality of hollow portions.

10. The backlight module as recited in claim 9, further comprising a first driving structure used to drive the light absorbing and reflecting film layer relative to the second reflective sheet, wherein when a facing area between each light absorbing and reflecting structure and the respective hollow portion decreases, an intensity of blue light reflected by the light absorbing and reflecting structure becomes smaller.

11. The backlight module as recited in claim 9, further comprising a second driving structure used to drive the second reflective sheet to move relative to the light absorbing and reflecting film layer, and wherein when a facing area between each light absorbing and reflecting structure and the respective hollow portion decreases, an intensity of blue light reflected by the light absorbing and reflecting structure becomes smaller.

12. A display device, comprising a display panel and a backlight module, the backlight module comprising:
a light guide plate, used to provide a surface light source for the display panel and having a first surface, a second surface and a light incident surface; wherein the first surface is a light emitting surface, and wherein the light incident surface connects the first surface and the second surface together;
a light source, disposed on the light incident surface of the light guide plate and used to provide a linear light source for the light guide plate;
a light absorbing and reflecting film layer, disposed on the second surface of the light guide plate and used to absorb light and reflect blue light; and
a first reflective sheet, disposed on a side of the light absorbing and reflecting film layer facing away from the light guide plate;
wherein the light absorbing and reflecting film layer comprises a magnesium layer, an amorphous silicon layer, and a silicon dioxide layer;
wherein the magnesium layer is disposed on the silicon dioxide layer, the silicon dioxide layer is disposed on the amorphous silicon layer, and a side of the magnesium layer facing away from the silicon dioxide layer is adjacent to the light guide plate; wherein a side of the amorphous silicon layer facing away from the silicon dioxide layer is adjacent to the first reflective sheet.

13. The backlight module as recited in claim 12, wherein the amorphous silicon layer has a thickness that lies in the range of 25 nm-40 nm, the silicon dioxide layer has a thickness that lies in the range of 185 nm-200 nm, and the magnesium layer has a thickness of 160 nm.

14. The backlight module as recited in claim 12, wherein the light absorbing and reflecting film layer comprises an amorphous silicon layer and a silicon dioxide layer;
wherein the silicon dioxide layer is disposed on the amorphous silicon layer, a side of the silicon dioxide layer facing away from the amorphous silicon layer is adjacent to the light guide plate; and wherein a side of the amorphous silicon layer facing away from the silicon dioxide layer is adjacent to the first reflective sheet;
wherein the amorphous silicon layer has a thickness that lies in the range of 10 nm-30 nm, and wherein the silicon dioxide layer has a thickness that lies in the range of 140 nm-160 nm.

15. The backlight module as recited in claim 12, wherein the light absorbing and reflecting film layer comprises a plurality of light absorbing and reflecting structures arranged in an array, and wherein a gap is defined between every two adjacent light absorbing and reflecting structures;
wherein the light absorbing and reflecting structure is used for absorbing light and reflecting blue light.

* * * * *